(12) United States Patent
Mumm et al.

(10) Patent No.: US 6,310,828 B1
(45) Date of Patent: Oct. 30, 2001

(54) METHOD AND DEVICE FOR SENSING ULTRASOUND IMAGES

(75) Inventors: Bernard Mumm, Mammendorf; Johannes Waldinger, Neubiberg; Dietmar Kaiser, Moosburg, all of (DE)

(73) Assignee: Tomtec Imaging Systems GmbH, Unterschliebheim (DE)

(*) Notice: Subject to any disclaimer, the term of this patent is extended or adjusted under 35 U.S.C. 154(b) by 0 days.

(21) Appl. No.: 09/463,710

(22) PCT Filed: Jul. 16, 1998

(86) PCT No.: PCT/EP98/04429

§ 371 Date: Jan. 27, 2000

§ 102(e) Date: Jan. 27, 2000

(87) PCT Pub. No.: WO99/04288

PCT Pub. Date: Jan. 28, 1999

(30) Foreign Application Priority Data

Jul. 18, 1997 (DE) .................................. 197 30 938

(51) Int. Cl.$^7$ ............................................... G01S 15/89
(52) U.S. Cl. .................................................. 367/7
(58) Field of Search ............................... 367/7, 11, 88; 600/443, 444, 445

(56) References Cited

U.S. PATENT DOCUMENTS 5,582,173 * 12/1996 Li .
5,645,066 * 7/1997 Gandini et al. .

* cited by examiner

Primary Examiner—Daniel T. Pihulic
(74) Attorney, Agent, or Firm—Sheridan Ross P.C.

(57) ABSTRACT

The invention relates to a method for sensing ultrasound images of an object (1). The method is characterized in that an ultra-sound head (3) is moved along the object so as to sense individual image subdomains (13) of said object (1). An evaluation subdomain (14) is analyzed in order to determine the extent of the object (1) or the spacing ($\delta x$) between the individual image subdomains (13). This evaluation subdomain (14) is sensed perpendicularly to the sensed image subdomains (13); that is, it represents a domain of the object (1) which overlaps at least two image subdomains (13). In this way, allocation within the individual image subdomains (13) can be determined by using the structures of the object (1) thus obtained. To this end, in particular a vertical column structure (11) of the object (1) (evaluation subdomain (14)) is analyzed, thus enabling allocation of a plurality of individual horizontal line structures (10), i.e. individual "layers" of the object (1) (image subdomains (13)) among themselves.

36 Claims, 2 Drawing Sheets

METHOD AND DEVICE FOR SENSING ULTRASOUND IMAGES

The invention relates to a method and a device for sensing ultrasound images, more particularly for sensing and representing three-dimensional ultrasound images in real time according to the preamble of claim 1.

Methods and devices for sensing ultrasound images of an object of this type are known, wherein an ultrasound transmitter emits ultrasound waves towards an object while an ultrasound receiver receives the ultrasound waves reflected by the object. In order to sense the object, the ultrasound transmitter or, respectively, the ultrasound receiver is moved along the object while individual image subdomains of the object are sensed. Normally, these image subdomains correspond to a line-wise scanning process sensing the object in a line-wise manner along a sensing direction in which the ultrasound transmitter or, respectively, the ultrasound receiver is moved. In the known ultrasound devices, the images generated in the ultrasound device may be taken to a post-processing device or, respectively, to a data processing system digitally or via a video output. Therein, the images may be stored or directly post-processed.

The object to be examined is sensed in a line-wise manner by the scanning process, i.e. individual parallel "layers" of the object are impinged upon with ultrasound waves and the corresponding reflected ultrasound waves are received in the ultrasound device. The received ultrasound waves are processed in a data processing system so that there results a grey value image on the display device, the individual grey values corresponding to ultrasound waves being reflected correspondingly stronger or weaker. These grey values provide information on the individual layers of the object, i.e. about the locations where the object comprises cavities or higher densified material regions, for instance.

The individual layers of the object, i.e. the individual line pictures of the ultrasound scanning process are "piled on top of each other" in the data processing system so that a three-dimensional representation of the object may be obtained on the display device. The differing spacings of different regions of a layer, i.e. the position of cavities or more densified material regions of the object, relative to the ultrasound device, are obtained via the evaluation of the grey value of each layer.

Between the ultrasound device and the object to be sensed, there is a sound medium promoting the propagation of ultrasound waves. This sound medium presents itself by a uniform grey value in the corresponding grey value image. More particularly, the outer contours of an object may be determined by detecting the first grey value changes on the boundary between the sound medium and the object to be examined in the grey value image and measuring their relative spacings to the ultrasound device.

The ultrasound methods use a predefined grey value step (threshold) or one to be calculated in order to find contours in the image. The contour information is then stored in an image and results in a three-dimensional image impression after evaluation of the distances between the ultrasound device or, respectively, the ultrasound head and the outer contours of the object to be examined.

These known ultrasound methods are for instance suitable for the examination of a foetus within the abdominal cavity of the mother or for the detection of renal calculi within the human body. In order to sense the object to be examined, which is situated within the human body, the ultrasound device is connected with the skin surface of the human body by means of a sound medium like for instance oil or water and moved along a desired sensing direction while ultrasound images are sensed in uniform time intervals. The whole scanning process extends over a specific region of the human body, individual layers of the object to be examined within the body being sensed successively during the scanning process. The individual ultrasound images are then put together in a subsequent data processing system so that there results a complete two-dimensional or three-dimensional image of the object as the individual images are "piled up".

It is especially important in this method that the spacings between the individual "layers", i.e. between the individual image subdomains of the object to be examined are almost constant in order to avoid any length distortion of the whole image along the sensing direction, i.e. along the scanning direction. In order to obtain a uniform sensing velocity, i.e. a uniform velocity of the ultrasound device along the sensing direction during the scanning process, the methods of the conventional type either use motor-controlled mechanisms for moving the ultrasound device or, respectively, magnetic position detectors in order to detect the respectively precise position of the ultrasound device with respect to the corresponding picture of the image subdomain, i.e. of the corresponding "layer" of the object to be examined. By detecting the precise position of the ultrasound device during the sensing of such a "layer", the individual image subdomains, i.e. the individual "layers" of the object to be examined may later be put together realistically in the data processing system. This makes it possible to avoid image distortions along the sensing direction in conventional systems.

If the extents of individual subdomains of the object are known, like for instance the orbital cavity of a foetus, the respectively corresponding image subdomains may be allocated directly among themselves, even without any evaluation subdomain. If a continuous sensing velocity is chosen, e.ge. an espeicaly uniform scanning through the examining doctor, all sensed image subdomains may even be allocated among themselves without any evaluation subdomain.

U.S. Pat. No. 5,582,173 discloses another method, which subdivides the individual image subdomains into image elements after the sensing of the individual image subdomains, wherein the image elements discriminate among themselves by different grey-value-information (speckles), in order to correlate the image elements or the different grey-value-information of adjacent image subdomains, respectively, among themselves by correlation-functions, to assess the distances between the individual image subdomains among themselves or the extent of the object.

These conventional systems are disadvantageous in that the corresponding ultrasound devices must be produced in a very expensively and cost-intensive manner, that the imaging method is very cumbersome to handle and that the operator like for instance the doctor must reckon with long imaging and post-processing times during the examination of a foetus in the womb. Also, the object had to stand still relatively to the movement mechanism of the ultrasound device in order to avoid the above-mentioned image distortions. Accordingly, it had been necessary for medical applications, for instance, to fix the patient in an ultrasound device in order to be able to carry out a controlled and uniform scanning process. Also, the conventionally used mathematical calculation methods for assessing and determining the distances of the image subdomains among themselves or the extent of the object require expensive and costly data processing equipment and a time consuming data processing.

It is the object underlying the invention to improve a method of the above-mentioned type to the effect that motor-controlled mechanisms or position recognitions of the ultrasound head may be renounced and thereby to provide a simple, economical ultrasound method or, respectively, ultrasound device which is easy to handle.

Moreover, it is the object underlying the invention to specify a method for sensing ultrasound images wherein the ultrasound head may be guided and operated manually, without additional devices for the guiding or the position recognition of the ultrasound head being necessary.

The invention meets the object as specified by the features specified in the characterising portion of claim 1. Advantageous embodiments of the invention are characterised in the subclaims.

According to the invention, an object to be examined, which is situated in an inaccessible body, for instance, is sensed by an ultrasound device. In the process, the ultrasound head, which advantageously contains the ultrasound transmitter and the ultrasound receiver is moved along a sensing direction while individual image subdomains of the object, i.e. individual "layers" of the object are sensed. These layers are stored in a data processing system and evaluated by using the grey value analysis described above. Subsequently, the layers are put together again using the sensed order so that there results an ultrasound image of the object to be examined. The resulting image may be represented to be two- or three-dimensional; moving images, so-called four-dimensional images may even be possible by lining-up and representing a plurality of these two- or three-dimensional images. The images may also be marked in colours in order to achieve an impression of the object to be examined which the operator may recognise more easily (flow representation). In the process, several pictures are taken of a location of a moving object, wherein the corresponding pictures (a plurality of image subdomains) of a movement condition of the object are respectively put together to form a resulting image. The plurality of resulting images then result, in succession, in a moving representation of the object (film projection).

In order to avoid image distortions along the sensing direction, the extent of the object is determined insofar as ultrasound waves are evaluated which are reflected by an evaluation subdomain lying substantially perpendicular with respect to the sensed image subdomains. These ultrasound waves are detected by the ultrasound head in that the latter is rotated by about 90° and takes a picture of the object to be examined, which lies substantially perpendicular with respect to the pictures of the previously sensed image subdomains.

The method is configured such that the object to be examined is first sensed in a line-wise manner and that the extent of the object is determined such that a picture of an evaluation subdomain is evaluated which is situated substantially perpendicularly with respect to the previously sensed image subdomains. After the extent of the object along the sensing direction has been defined, the individual "layers" may be "piled up" in uniform spacings between each other so that there results a realistic image of the object to be examined. During the scanning process, the object advantageously remains still. The sensing sequence of the image subdomains and the evaluation subdomain does not matter.

In order to obtain an especially realistic representation of the object, it is recommended to move the ultrasound transmitter and/or the ultrasound receiver or, respectively, the ultrasound head along the sensing direction at a uniform velocity.

However, differing spacings of the sensed image subdomains of the object to be examined may also be determined via the evaluation of the picture of the evaluation subdomain. This is done by a comparison between the structures of the evaluation subdomain and the structures of the individual image subdomains which had previously been sensed and stored. The correspondingly evaluated grey values or, respectively, the colour values of the individual layers (in dependence upon the ultrasound device used), i.e. of the individual image subdomains of the object, represent the surface structure of each layer of the object. By comparing this surface structure with the surface structure of the evaluation subdomain, i.e. by comparing the "line" structure with the "column" structure, one may determine, if the respective structures correspond to each other, the intersections of the individual image subdomains, i.e. of the individual layers with the evaluation subdomains. This makes it possible to allocate the individual image subdomains among themselves, i.e. the individual layers of the object to be examined may be disposed both vertically and horizontally using these intersections so that there results a realistic and undistorted image of the object.

The depth information of the ultrasound waves which are reflected by the image subdomains and/or by the evaluation subdomain is obtained in that one first defines a direction substantially being perpendicular with respect to a reference plane being parallel with respect to the sensing direction and evaluates the different grey value information for the ultrasound image along this direction. This results in the relief-like surface structures of the object to be examined.

The method according to the invention may also be used for the realistic representation of three-dimensional objects by aligning the individual cross-sections, i.e. the individual "layers" of the object according to the corresponding longitudinal section, i.e. the evaluation subdomain of the object.

A special embodiment of the present invention will be explained in detail upon reference to the drawings. Therein:

The foregoing description of the present invention has been presented for purposes of illustration and description. Furthermore, the description is not intended to limit the invention to the form disclosed herein. Consequently, variations and modifications commensurate with the above teachings, in the skill or knowledge of the relevant art, are within the scope of the present invention. The embodiments described herein above are further intended to disclose best modes for practicing the invention and to enable others skilled in the art to utilize the invention and such, or other, embodiments and with various modifications required by the particular applications or uses of the present invention. It is intended that the appended claims be construed to include alternative embodiments to the extent permitted by the prior art.

Figure 1:
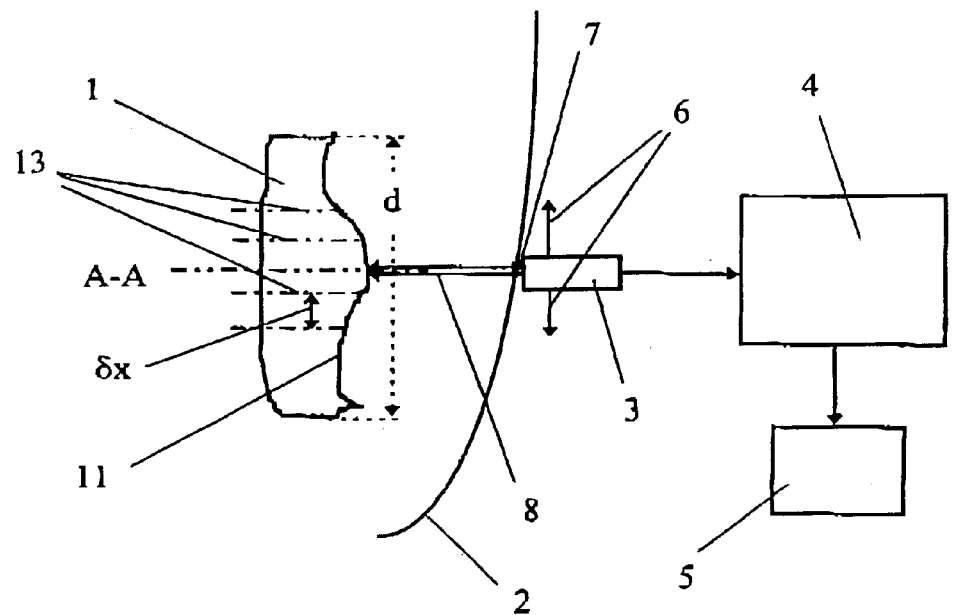
FIG. 1 is a cross-section through an ultrasound scanning device during the scanning process.

FIG. 1 shows the cross-section through an ultrasound scanning device during the scanning process. An object 1, which is situated within a body 2 is scanned by an ultrasound head 3. Ultrasound head 3 is connected with a data processing system 4 which displays the processed ultrasound images on a display device 5. Data processing system 4 (or a control system not represented here) provides the corresponding signals for driving ultrasound head 3 and comprises inputs for the received ultrasound signals of ultrasound head 3. Ultrasound head 3, which comprises an ultrasound transmitter and an ultrasound receiver, emits ultrasound waves 8 through a sound medium 7 and a wall of body 2 in the direction of object 1 which reflects and reverberates ultrasound waves 8 in the direction of ultrasound head 3. Ultrasound head 3 receives ultrasound waves 8 reflected from object 1 and emits the data received to the data processing system 4.

In order to sense an image subdomain 13, ultrasound head 3 remains still or comprises a movement velocity being negligible compared to the speed of sound until it has conveyed the reflected ultrasound waves 8 to data processing system 4. Subsequently, ultrasound head 3 is moved in a sensing direction 6 in order to sense the next image subdomain 13 of object 1. The individual image subdomains 13 comprise a spacing δx between each other. In the case of a uniform movement velocity of ultrasound head 3, this spacing δx may be equidistant in sensing direction 6 or the individual spacings δx of image subdomains 13 may also vary in the case of a non-uniform movement velocity of ultrasound head 3.

The known sound media like, for instance, oil, water, gel or the like are suitable as ultrasound medium 7 between ultrasound head 3 and the wall of body 2. Column structure 11 (outer contour in sensing direction 6) extends along extent d of object 1 in sensing direction 6.

Figure 2:
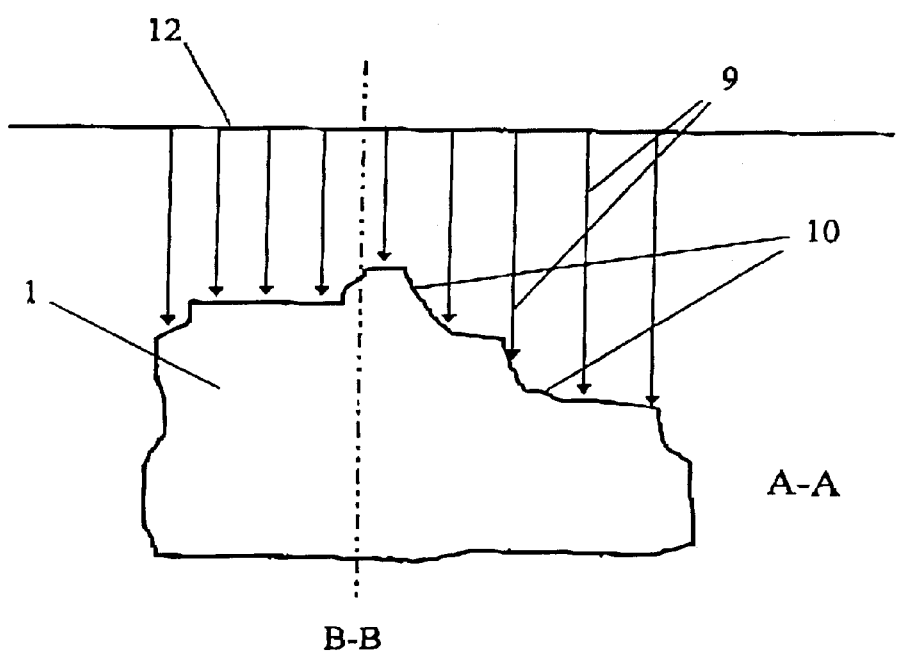
FIG. 2 shows the determination of the depth information of an image subdomain of a section A—A according to FIG. 1.

The individual "layer" pictures, i.e. the individual image subdomains 13 of object 1 are buffered in data processing system 4, the corresponding depth information 9 being calculated according to FIG. 2.

FIG. 2 shows the section A—A through object 1 according to FIG. 1, i.e. a horizontal section through object 1. According to a reference plane 12 which is defined in data processing system 4 and disposed parallel with respect to sensing direction 6, the individual spacings between line structures 10 (i.e. the horizontal structures of the individual layers of object 1) are calculated. This is done via the evaluation of predefined grey value steps (thresholds) or ones to be calculated, which reproduce the different material regions of object 1 which are more or less densified. According to the density of the material within object 1, there result differing grey values from the evaluation of reflected ultrasound values 8 in data processing system 4, wherefrom the surface structures (in the present case: line structure 10) may be determined. Depth information 9 defines the third dimension of object 1, which may be represented via suitable, computer-supported display devices 5.

Figure 3:
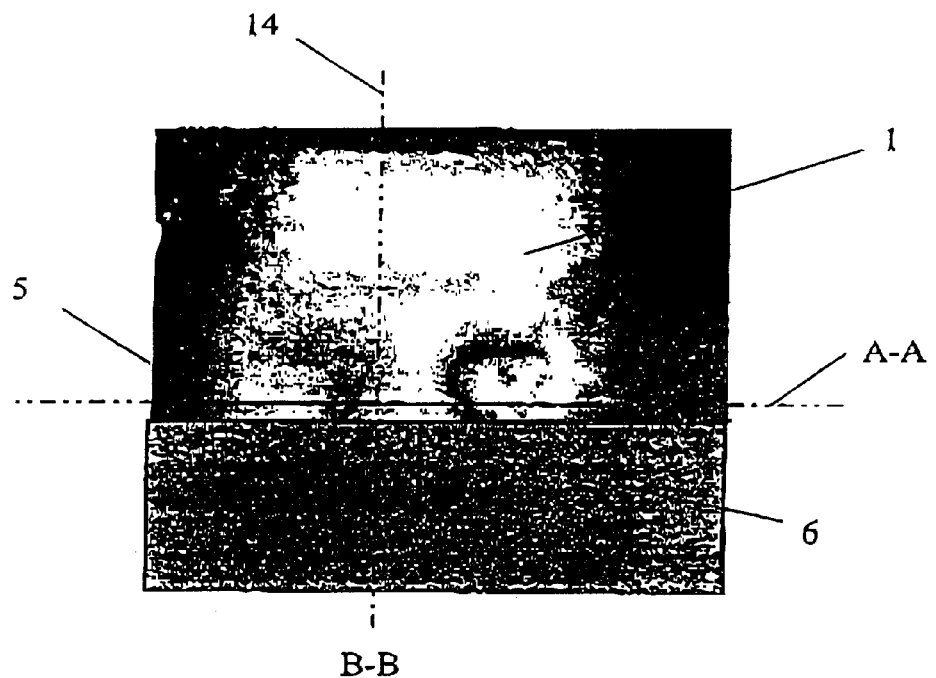
FIG. 3 is an ultrasound image of a foetus head during the scanning process.

FIG. 3 shows the structure of a three-dimensional ultrasound image during the scanning process of an ultrasound head 3 on a display device 5, wherein the individual image subdomains 13 are represented one behind the other in a "piled-up" manner, the depth information 9 calculated according to FIG. 2 already having been obtained by suitable representation means. FIG. 3 also shows section A—A according to FIG. 1.

Such an ultrasound image is established via linewise scanning of the object 1 to be examined in the sensing direction 6. In order to determine the extent d of object 1 or, respectively, to determine the individual spacings δx of image subdomains 13, the image put together according to FIG. 3 is scanned again in at least one direction being substantially perpendicular with respect to sensing direction 6. Evaluation subdomain 14, which, according to FIG. 3 stands perpendicularly on section A—A according to FIG. 1, provides the necessary information for calibrating the individual image subdomains 13 and for precisely "stratifying" the image subdomains 13 which have already been stored and provided with the corresponding depth information 9. By evaluating the evaluation subdomain 14, i.e. by detecting the corresponding structures of object 1 along section B—B according to FIG. 3, these image subdomains 13 may be allocated among themselves via a comparison between these structures and corresponding structures of horizontal image subdomains 13.

Figure 4:
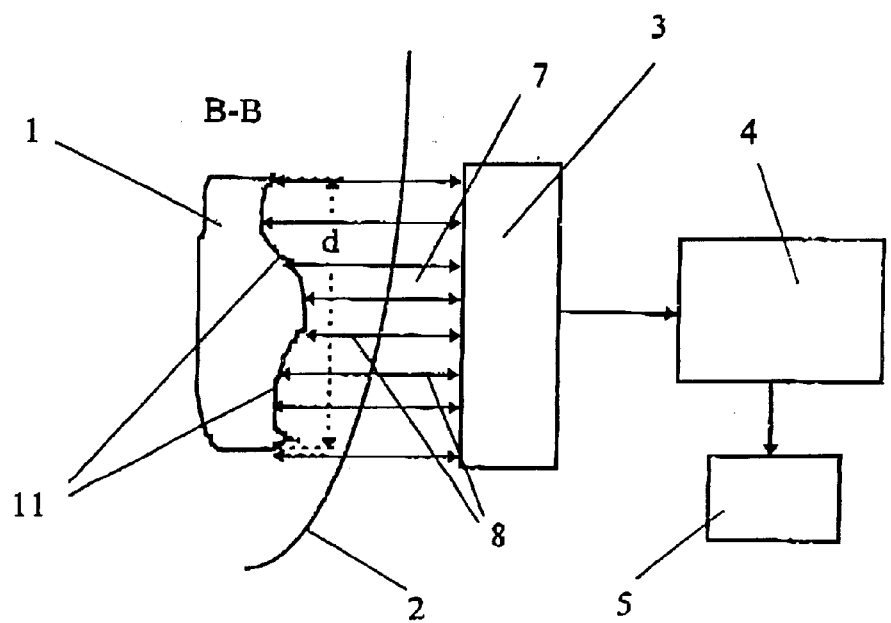
FIG. 4 is a cross-section through an ultrasound scanning device during the sensing of the evaluation subdomain.

FIG. 4 shows a section through ultrasound head 3 according to FIG. 1, which is rotated by about 90° and senses evaluation subdomain 14 according to section B—B of FIG. 3. Column structure 11 of evaluation subdomain 14, which is thereby obtained, is conveyed from ultrasound head 3 towards data processing system 4. Data processing system 4 compares column structure 11 with line structures 10 of image subdomains 13 and thereby calibrates the stored sequence of the corresponding image subdomains 13. Subsequently, image subdomains 13 are allocated among themselves according to said calibration and there results a realistic, i.e. undistorted picture of the object 1 to be examined, i.e. the foetus head according to FIG. 3, for instance.

What is claimed is:

1. A method for sensing ultrasound images of an object, comprising:

providing an ultrasound transmitter for emitting ultrasound waves onto the object and an ultrasound receiver for receiving ultrasound waves reflected from the object, at least one of the ultrasound transmitter and the ultrasound receiver being moved along the object for sensing individual image subdomains of the object, determining at least one of spacings of the image subdomains among themselves and an extent of the object along the sensing direction to represent the object for determining said spacings of image subdomains at least one of among themselves and said extent of the object, evaluating the sensing of an evaluation subdomain of said object wherein the picture of said evaluation subdomain represents a domain of the object, which overlaps at least two image subdomains.

2. A method according to claim 1, wherein the object is sensed in a line-wise manner by image subdomains being directed perpendicularly with respect to the sensing direction of the ultrasound transducer, and the extent of at least one of the object and spacings of the image subdomains among themselves are determined by evaluation of a picture of an evaluation subdomain which is directed substantially orthogonal with respect to the image subdomains.

3. A method according to claim 1, wherein the at least one ultrasound transmitter and ultrasound receiver is moved at a uniform velocity along the sensing direction.

4. A method according to claim 1, wherein, for determining the at least one of the extent of the object and the spacings of the image subdomains, pictures of an evaluation subdomain are used which reproduce the column structure of the object, which correspond to the pictures of individual image subdomains, which reproduce the line structures of the object, at the intersections of the image subdomains and the evaluation subdomain.

5. A method according to claim 1, wherein the depth information of the ultrasound waves reflected by at least one of the image subdomains and the evaluation subdomain is used for determining the surface structures of the object, the depth information being determined in a direction being substantially perpendicular with respect to a reference plane being parallel to the sensing direction.

6. A method according to claim 1, wherein the images formed from the image subdomains are at least one of processed and displayed in real time during the sensing of the object.

7. A method according to claim 1, wherein the object is sensed in a body.

8. A device for a method according to claim 1, wherein the ultrasound transmitter and the ultrasound receiver are integrated in an ultrasound head.

9. A device according to claim 8, wherein at least one of a data processing system and the ultrasound device processes the ultrasound images and a display device displays the resulting images.

10. A method according to claim 2, wherein the at least one ultrasound transmitter and ultrasound receiver is moved at a uniform velocity along the sensing direction.

11. A method according to claim 2, wherein, for determining the at least one of the extent of the object and the spacings of the image subdomains, pictures of an evaluation subdomain are used which reproduce the column structure of the object, which correspond to the pictures of individual image subdomains, which reproduce the line structures of the object, at the intersections of the image subdomains and the evaluation subdomain.

12. A method according to claim 3, wherein, for determining the at least one of the extent of the object and the spacings of the image subdomains, pictures of an evaluation subdomain are used which reproduce the column structure of the object, which correspond to the pictures of individual image subdomains, which reproduce the line structures of the object, at the intersections of the image subdomains and the evaluation subdomain.

13. A method according to claim 2, wherein the depth information of the ultrasound waves reflected by at least one of the image subdomains and the evaluation subdomain is used for determining the surface structures of the object, the depth information being determined in a direction being substantially perpendicular with respect to a reference plane being parallel to the sensing direction.

14. A method according to claim 3, wherein the depth information of the ultrasound waves reflected by at least one of the image subdomains and the evaluation subdomain is used for determining the surface structures of the object the depth information being determined in a direction being substantially perpendicular with respect to a reference plane being parallel to the sensing direction.

15. A method according to claim 4, wherein the depth information of the ultrasound waves reflected by at least one of the image subdomains and the evaluation subdomain is used for determining the surface structures of the object, the depth information being determined in a direction being substantially perpendicular with respect to a reference plane being parallel to the sensing direction.

16. A method according to claim 2, wherein the images formed from the image subdomains are at least one of processed and displayed in real time during the sensing of the object.

17. A method according to claim 3, wherein the images formed from the image subdomains are at least one of processed and displayed in real time during the sensing of the object.

18. A method according to claim 4, wherein the images formed from the image subdomains are at least one of processed and displayed in real time during the sensing of the object.

19. A method according to claim 5, wherein the images formed from the image subdomains are at least one of processed and displayed in real time during the sensing of the object.

20. A method according to claim 2, wherein the object is sensed in a body.

21. A method according to claim 3, wherein the object is sensed in a body.

22. A method according to claim 4, wherein the object is sensed in a body.

23. A method according to claim 5, wherein the object is sensed in a body.

24. A method according to claim 6, wherein the object is sensed in a body.

25. A device for a method according to claim 2, wherein the ultrasound transmitter and the ultrasound receiver are integrated in an ultrasound head.

26. A device for a method according to claim 3, wherein the ultrasound transmitter and the ultrasound receiver are integrated in an ultrasound head.

27. A device for a method according to claim 4, wherein the ultrasound transmitter and the ultrasound receiver are integrated in an ultrasound head.

28. A device for a method according to claim 5, wherein the ultrasound transmitter and the ultrasound receiver are integrated in an ultrasound head.

29. A device for a method according to claim 6, wherein the ultrasound transmitter and the ultrasound receiver are integrated in an ultrasound head.

30. A device for a method according to claim 7, wherein the ultrasound transmitter and the ultrasound receiver are integrated in an ultrasound head.

31. A device according to claim 25, wherein at least one of a data processing system and the ultrasound device processes the ultrasound images and a display device displays the resulting images.

32. A device according to claim 26, wherein at least one of a data processing system and the ultrasound device processes the ultrasound images and a display device displays the resulting images.

33. A device according to claim 27, wherein at least one of a data processing system and the ultrasound device processes the ultrasound images and a display device displays the resulting images.

34. A device according to claim 28, wherein at least one of a data processing system and the ultrasound device processes the ultrasound images and a display device displays the resulting images.

35. A device according to claim 29, wherein at least one of a data processing system and the ultrasound device processes the ultrasound images and a display device displays the resulting images.

36. A device according to claim 30, wherein at least one of a data processing system and the ultrasound device processes the ultrasound images and a display device displays the resulting images.

* * * * *